United States Patent
Bleuel et al.

[19]

[11] Patent Number: 5,992,263
[45] Date of Patent: Nov. 30, 1999

[54] DEVICE FOR LOCKING AN ADJUSTABLE STEERING COLUMN, ESPECIALLY FOR MOTOR VEHICLES

[75] Inventors: Walter Bleuel, Hofheim/Ts.; Wolfgang Markard, Florsheim, both of Germany

[73] Assignee: General Motors Corporation, Detroit, Mich.

[21] Appl. No.: 08/880,715

[22] Filed: Jun. 23, 1997

[30] Foreign Application Priority Data

Jul. 19, 1996 [DE] Germany ................ 196 29 246

[51] Int. Cl.$^6$ ................................. B62D 1/18
[52] U.S. Cl. .................. 74/493; 74/531; 280/775; 403/110
[58] Field of Search ............... 74/493, 531; 280/775, 280/779; 403/109.7, 109.1, 110

[56] References Cited

U.S. PATENT DOCUMENTS

| | | | |
|---|---|---|---|
| 3,387,865 | 6/1968 | Ross | 403/343 |
| 4,472,982 | 9/1984 | Nishikawa | 74/493 |
| 5,064,219 | 11/1991 | Schaible et al. | 74/493 |
| 5,257,813 | 11/1993 | Snell | 74/493 |
| 5,555,772 | 9/1996 | Schneider | 74/493 |
| 5,681,127 | 10/1997 | Willen | 403/409.1 |

FOREIGN PATENT DOCUMENTS

| | | |
|---|---|---|
| 30 16 212 A1 | 10/1981 | Germany . |
| 32 05 416 A1 | 10/1982 | Germany . |
| 39 25 706 C1 | 1/1991 | Germany . |
| 2273338 | 6/1994 | United Kingdom ........... 74/531 |
| 91/06461 | 5/1991 | WIPO . |
| 96/16858 | 6/1996 | WIPO . |

*Primary Examiner*—Tamara L. Graysay
*Assistant Examiner*—William C Joyce
*Attorney, Agent, or Firm*—Edmund P. Anderson

[57] ABSTRACT

A locking device for locking an adjustable steering column in an adjusted position including a lateral clamping element having enlarged heads at opposite ends thereof and a piston and a cylinder between the enlarged heads and a rotatable locking rod for locking or unlocking the steering column arranged axially immovable relative to the steering column and compactly in a space that is little used. The piston and cylinder have overlapping bores parallel to the centerline of the steering column. The locking rod, also parallel to the centerline of the steering column, has an oval-shaped portion protruding through the overlapping bores so that when the long axis of the oval-shaped portion is vertical the clamping element is loose and the steering column is vertically and horizontally adjustable and when the long axis of the oval-shaped portion is horizontal the clamping element is tight and the steering column is vertically and horizontally locked.

3 Claims, 3 Drawing Sheets

DEVICE FOR LOCKING AN ADJUSTABLE STEERING COLUMN, ESPECIALLY FOR MOTOR VEHICLES

TECHNICAL FIELD

The invention relates to a device for locking an adjustable steering column in an adjusted position.

BACKGROUND OF THE INVENTION

German patent DE 39 25 706 C1 describes a device for locking an adjustable steering column in an adjusted position in which a clamping device is provided with an eccentric element arranged axially on the activation rod in order to lock the swiveling steering column. Upon rotation of the activation rod, by means of the eccentric element and a pull rod connected to the activation rod, the steering column is clamped between two brackets of the vehicle structure. A disadvantage of this design is the complicated structure of the eccentric element and its arrangement off-set with respect to the pull rod outside of the brackets of the vehicle structure.

SUMMARY OF THE INVENTION

This invention is a new and improved device for locking an adjustable steering column in an adjusted position which is of compact structure and lowers production and engineering costs. The locking device according to this invention includes a lateral clamping element having enlarged heads at opposite ends thereof and a piston and a cylinder between the enlarged heads and a rotatable activation rod for locking or unlocking the steering column arranged axially immovable relative to the steering column and compactly in a space that is little used. The piston and cylinder have overlapping bores therein parallel to the centerline of the steering column. The activation rod, also parallel to the centerline of the steering column, has an oval-shaped portion protruding through the overlapping bores so that when the long axis of the oval-shaped portion is vertical the clamping element is loose and the steering column is vertically and horizontally adjustable and when the long axis of the oval-shaped portion is horizontal the clamping element is tight and the steering column is vertically and horizontally locked.

DESCRIPTION OF PREFERRED EMBODIMENTS

Figure 1:
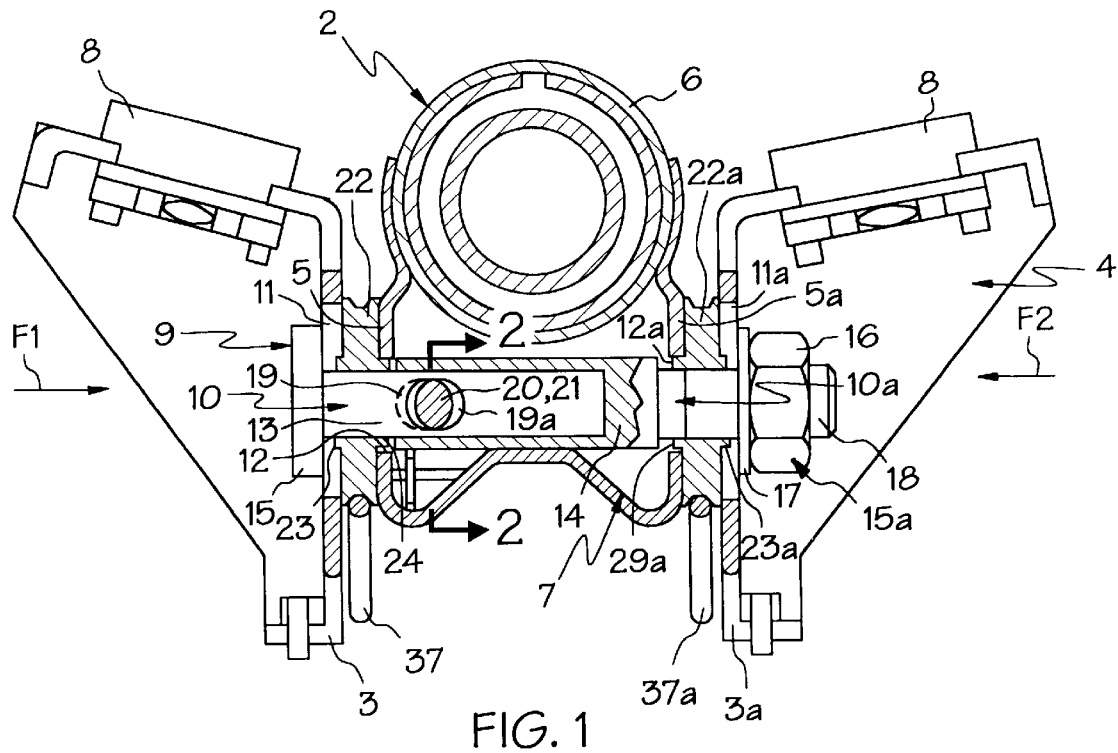
FIG. 1 a lateral sectional view of a locking device according to this invention taken generally in the region of a clamping element of the locking device.

Referring to FIG. 1, a steering column 2 is supported on a motor vehicle body by a steering column support 4 connected to a vehicle structure 8 in a manner not shown in detail having two supporting parts 3, 3a aligned parallel and vertically and by a U-shaped holder 7 having two parallel and vertically aligned legs 5, 5a whose free ends are welded to a jacket tube 6 of the steering column 2. The steering column 2 can be locked in vertically and horizontally adjusted positions by means of a locking device 9 according to this invention which clamps the holder 7 between the supporting parts 3, 3a.

Figure 3:
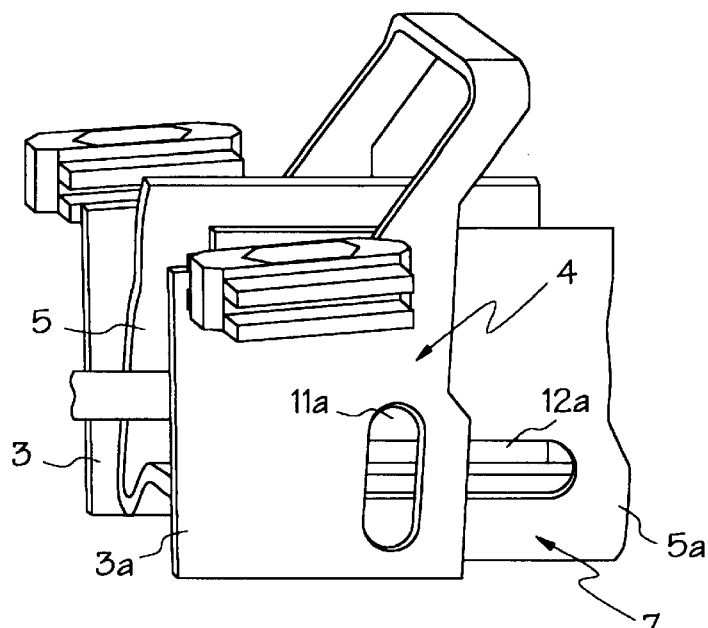
FIG. 3 is a fragmentary perspective view of the locking device according to this invention.

To adjust the steering column 2, as illustrated in FIG. 3, guide slots 11, 11a running essentially perpendicular to the steering column 2 on the supporting parts 3, 3a in each case and guide slots 12, 12a arranged on the legs 5, 5a in each case approximately axially parallel to the steering column 2 are provided. The neighboring guide slots 11, 12, 11a, 12a, in this case are arranged in a crossing manner and thus form a rocker arm guide for two clamping elements 10, 10a, arranged in a clampable manner in the cross direction or laterally of the vehicle (FIG. 1), and of the locking device 9.

The clamping elements 10, 10a form of a cylinder-piston unit including a cylindrical part 14 on the clamping element 10a and a piston part 13 on the clamping element 10 axially displaceable in the cylindrical part 14. The clamping elements 10, 10a have their opposite ends through the guide slots 11, 12, 11a, 12a with a head part 15, 15a on the clamping elements 10, 10a outside of the corresponding supporting parts 3, 3a. The head part 15a in this case is formed by a nut 16 and, between the nut 16 and the supporting part 3a, a washer 17 which are mounted on a threaded shaft portion 18 of the cylindrical part 14. The steering column 2 is therefore supported on the one hand (for height adjustment) together with the clamping elements 10, 10a in the approximately vertical guide slots or slotted guides 11, 11a and on the other (for longitudinal adjustment) by means of the approximately horizontally arranged guide slots 12, 12a on the clamping elements 10, 10a in a moveable manner.

Figure 8:
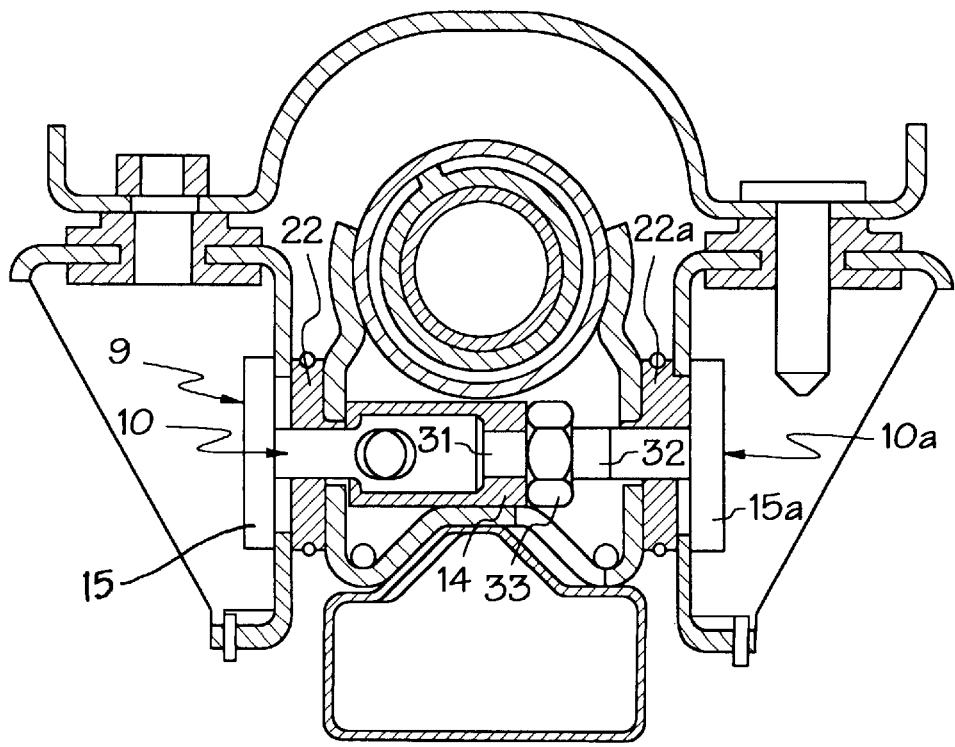
FIG. 8 is similar to FIG. 1 but showing a modified embodiment of the locking device according to this invention.

An alternative design of the locking device 9 is shown in FIG. 8. In this arrangement on the cylindrical part 14 of the clamping element 10a an axially arranged threaded boring 31 is provided into which a threaded shaft 32 is screwed. The threaded shaft 32 in this case is formed as one part with the head part 15a. To adjust the locking device 9, a nut 33 is provided on the threaded shaft 32 which is tightened after the adjustment of the distance between the head parts 15, 15a.

To achieve an optimal displacement and locking of the steering column 2, between the supporting parts 3, 3a and the legs 5, 5a on the clamping element 10, 10a a pair of guide disks or washers 22, 22a are provided (FIGS. 1 and 8) with collars 23, 23a on the guide discs closely engaging the guide slots 11, 11a and with collars 24, 24a on the guide discs closely engaging the guide slots 12, 12a. Upon the adjustment of the steering column 2 the movement of adjustment is supported in the vertical direction by a pair of springs 37, 37a acting from below on the guide disks 22, 22a.

Figure 2:
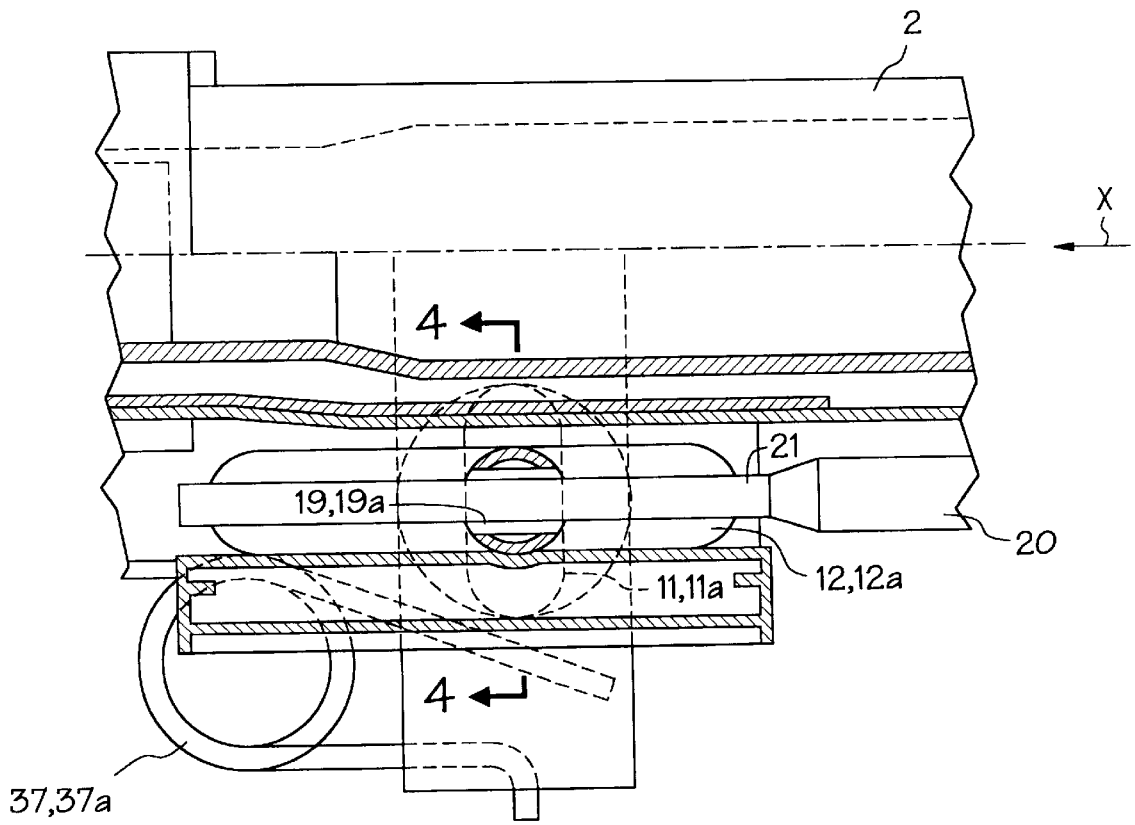
FIG. 2 a sectional view taken generally along the plane indicated by lines 2—2 in FIG. 1.

The clamping elements 10, 10a, on the piston part 13 and on the cylindrical part 14, have borings 19, 19a which are arranged axially parallel to the steering column, i.e., perpendicular to the longitudinal centerline of the clamping elements 10, 10a, and partially overlap. The two borings 19, 19a are pierced by an activation rod 20 arranged also axially parallel to the steering column 2 with an oval cross section 21 in the borings 19, 19a. The activation rod 20 is supported rotatably but axially immovably relative to the steering column 2 at the other end, as shown in FIG. 2, on a steering lock housing (FIG. 6) of the steering column 2 near the steering wheel so that upon the adjustment of the steering column 2 the position of the activation rod 20 relative to the steering column 2 is preserved.

Figures 4, 5:
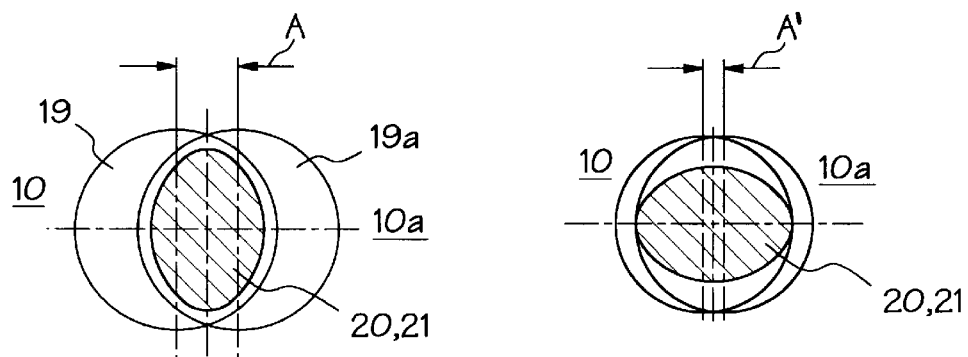
FIG. 4 is a sectional view taken generally along the plane indicated by lines 4—4 in FIG. 2.
FIG. 5 is similar to FIG. 4 but showing features of the clamping element in different relative positions.

In FIGS. 4 and 5, the clamping of the clamping elements 10, 10a by means of the activation rod 20 is illustrated. As FIG. 4 shows, in the unlocked state the largest diameter of the activation rod 20 in the region of the oval cross-section 21 is aligned approximately vertically so that the clamping elements 10, 10a in each case are in the position pushed farthest apart from each other. In this position of the activation rod 20, the borings 19, 19a of the clamping elements 10, 10a overlap approximately halfway and the head parts 15, 15a (FIGS. 1 and 8) of the clamping elements 10, 10a lie without tension on the corresponding supporting parts 3, 3a. Upon rotation of the oval cross-section 21 by about 90°—as a result of the rotation of the activation rod 20—the clamping elements 10, 10a move toward each other and thus tighten the holder 7 between the supporting parts 3, 3a. The difference between the dimension A which is the maximal distance of the vertical central axes of the borings 19, 19a from each other in the unlocked position and the dimension A' which is the minimal distance between the central axes in the locked position thus determines the maximal clamping movement of the clamping elements 10, 10a which depends essentially on the dimensions of the oval cross-section 21 and the borings 19, 19a. If as shown in FIG. 5 the largest diameter of the oval cross-section 21 is an approximately horizontal position, the highest clamping force is achieved and the holder 7 connected to the steering column 2 is firmly clamped to the steering column support 4.

Figure 6:
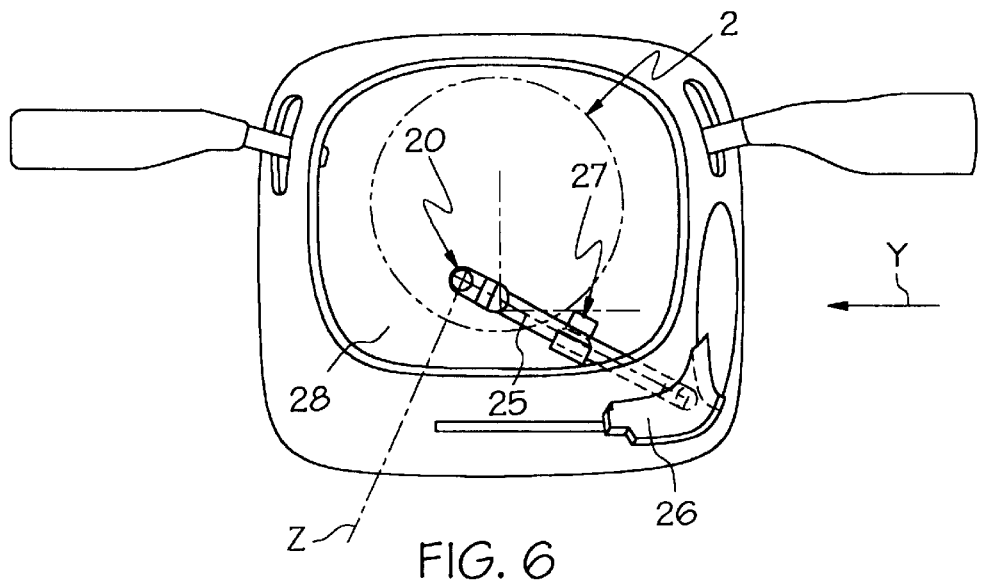
FIG. 6 a view taken generally in the direction identified by arrow X in FIG. 2.

To rotate the activation rod 20 between the locked and the unlocked positions—as shown in FIG. 6—at the end of the activation rod 20 near the steering wheel, an activation lever 25 arranged approximately perpendicular to the activation rod 20 is provided which, upon the locking of the steering column 2, audibly and palpably engages a snapping device 27 arranged on the steering lock housing 28. The snapping device 27 in this case consists of conventional, and therefore not described in detail, elastic spring elements which surround the activation lever 25 designed as a round rod in a partially force-locking and/or form-fitting manner at least in this region. The position of the activation lever 25 in the unlocked position is indicated in a simplified way by the broken dotted line Z.

Figure 7:
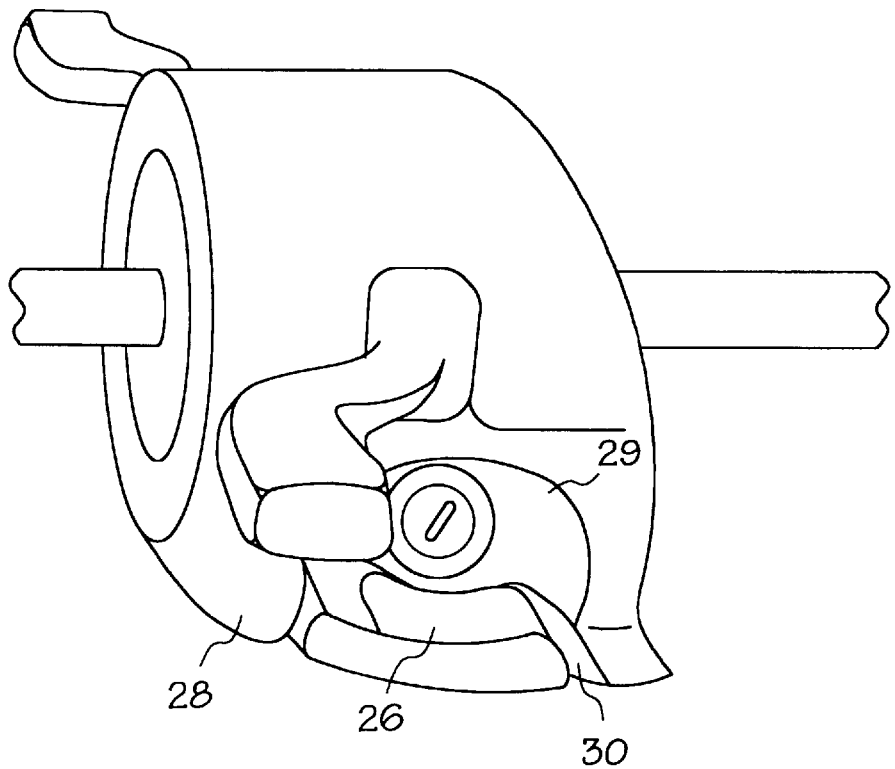
FIG. 7 is a perspective view taken generally in the direction identified by arrow Y in FIG. 6.

In order to operate the locking device 9 better, a handle 26 is provided at the free end of the activation lever 25 which in the locked position as shown in FIG. 7 is in a recess 30 on the steering lock 29. In this position, which can easily be observed visually, the handle 26 can be very favorably reached and activated in order to adjust the steering column 2.

We claim:

1. A locking device operative to clamp a first pair of vertical side of a bracket on a body of a motor vehicle against a second pair of vertical sides of a bracket on a steering column of the motor vehicle disposed between the first pair of vertical sides comprising a first clamping element having a cylinder portion thereon and an enlarged head at an end thereof, a second clamping element having a piston portion thereon and an enlarged head at an end thereof, the piston portion being slidably disposed in the cylinder portion to vary a span between the enlarged heads on the first and the second clamping elements, the first and the second clamping elements being disposed laterally of the steering column in a plurality of slots in the first pair of vertical sides and in the second pair of vertical sides with the enlarged heads on the first and the second clamping elements on opposite sides of the first pair of vertical sides so that reduction of the span between the enlarged heads clamps the first pair of vertical sides against the second pair of vertical sides, a first bore in the first clamping element axially parallel to the steering column, a second bore in the second clamping element axially parallel to the steering column overlapping the first bore, a locking rod having an oval-shaped cross section in the overlapped first bore and second bore, and means operative to mount the locking rod on the steering column for movement as a unit with the steering column and for rotation relative thereto in the overlapped first bore and second bore, the oval-shaped cross section being operative in response to rotation of the locking rod to a position in which a maximum dimension of the oval-shaped cross section is substantially horizontal to minimize the span between the enlarged heads on the first and the second clamping elements thereby to clamp the first pair of vertical sides against the second pair of vertical sides, the enlarged head at the end of the first clamping element comprising:
a bore in the cylinder portion having a screw thread therein,
a shaft having an enlarged head,
a screw thread on the shaft received in the screw thread in the cylinder portion so that rotation of the shaft relative to the bore adjusts the span between the enlarged head on the shaft and the enlarged head on the second clamping element, and
a nut on the screw thread on the shaft engageable on the first clamping element to capture the position of the shaft relative to the first clamping element.

2. A locking device operative to clamp a first pair of vertical sides of a bracket on a body of a motor vehicle against a second pair of vertical sides of a bracket on a steering column of the motor vehicle disposed between the first pair of vertical sides comprising:

a first clamping element having a cylinder portion thereon and an enlarged head at an end thereof, a second clamping element having a piston portion thereon and an enlarged head at an end thereof, the piston portion being slidably disposed in the cylinder portion to very a span between the enlarged heads on the first and second clamping elements, the first and second clamping elements being disposed laterally of the steering column in a plurality of slots in the first pair of vertical sides and in the second pair of vertical sides with the enlarged heads on the first and the second clamping elements on opposite sides of the first pair of vertical sides so that reduction of the span between the enlarged heads clamps the first pair of vertical sides against the second pair of vertical sides, the plurality of slots in the first pair of vertical sides and the second pair of vertical sides comprising a pair of vertical slots in one of the first pair of vertical sides and the other pair of vertical sides and a pair of horizontal slots on the other of the first pair of vertical sides and the second pair of vertical sides, a first bore in the first clamping element axially parallel to the steering column, a second bore in the second clamping element axially parallel to the steering column overlapping the first bore, a locking rod having an oval-shaped cross section in the overlapped first bore and second bore, means operative to mount the locking rod on the steering column for movement as a unit with the steering column and for rotation relative thereto in the overlapped first bore and second bore, the oval-shaped cross section being operative in response to rotation of the locking rod to a position in which a maximum dimension of the oval-shaped cross section is substantially horizontal to minimize the span between the enlarged heads on the first and the second clamping elements thereby to clamp the first pair of vertical sides against the second pair of vertical sides, a handle on an end of the locking rod rotatable as a unit therewith, and a recess on the steering column in which the handle on the locking rod seats in the position of the locking rod in which the maximum dimension of the oval-shaped cross section of the locking rod is substantially horizontal.

3. The locking device recited in claim 2 further comprising:

a latching means between the steering column and the handle on the locking rod operative to capture the locking rod in the position thereof in which the maximum dimension of the oval-shaped cross section thereof is substantially horizontal and to provide a perceptible signal corresponding achievement of such capture.

* * * * *